(12) United States Patent
Gruhlke

(10) Patent No.: US 6,947,223 B2
(45) Date of Patent: Sep. 20, 2005

(54) MULTI-FOCAL LENGTH MINIATURE REFRACTIVE ELEMENT AND METHOD FOR MAKING THE SAME

(75) Inventor: Russell W. Gruhlke, Fort Collins, CO (US)

(73) Assignee: Agilent Technologies, Inc., Palo Alto, CA (US)

(*) Notice: Subject to any disclaimer, the term of this patent is extended or adjusted under 35 U.S.C. 154(b) by 0 days.

(21) Appl. No.: 10/648,554

(22) Filed: Aug. 25, 2003

(65) Prior Publication Data
US 2005/0046956 A1 Mar. 3, 2005

(51) Int. Cl.[7] .............................. G02B 3/10; G02B 3/08; G03C 5/00
(52) U.S. Cl. ...................... 359/721; 359/741; 430/321
(58) Field of Search ................................ 359/642, 668, 359/721, 741, 796, 797; 351/161, 168, 177; 430/321

(56) References Cited

U.S. PATENT DOCUMENTS

| | | | | | |
|---|---|---|---|---|---|
| 3,610,924 A | * | 10/1971 | Sinai | ........................ | 250/492.1 |
| 4,450,593 A | * | 5/1984 | Poler | ........................... | 623/6.4 |
| 5,618,474 A | * | 4/1997 | Liau et al. | .................... | 264/1.1 |
| 5,760,871 A | * | 6/1998 | Kosoburd et al. | ........... | 623/6.3 |
| 2004/0184155 A1 | * | 9/2004 | Kornblit et al. | ............ | 359/619 |

* cited by examiner

Primary Examiner—Georgia Epps
Assistant Examiner—William Choi (57) ABSTRACT

A monolithic multi-focal length miniature refractive element comprising a first surface region and a second surface region. The first surface region has a first characteristic radius of curvature. The second surface region has a second radius of curvature that is different from the first characteristic radius of curvature. The first and second surface regions are formed on a single optical element blank. The optical element blank can be a composite of two or more materials.

17 Claims, 9 Drawing Sheets

MULTI-FOCAL LENGTH MINIATURE REFRACTIVE ELEMENT AND METHOD FOR MAKING THE SAME

FIELD OF INVENTION

Various embodiments in accordance with the invention relate to the field of refractive optical element fabrication.

BACKGROUND OF THE INVENTION

A typical convex lens has a uniform radius of curvature and is characterized by a single focal length. However, there are optical applications that require or benefit from the use of miniature focusing elements having more than one focal length. For example, the depth of focus for an optical system can be increased by using a lens having more than one focal length. Increasing the depth of focus in an optical system reduces the loss of image sharpness that may result from misalignment. For laser optical systems, multiple focal lengths can be used to provide control over the power density distribution along the beam axis.

For purposes of the present application, a "miniature optical element" refers to an optical element having a maximum dimension of less than five millimeters. Fabricating miniature optical elements with multiple focus points is very challenging. Currently, diffractive lenses can be fabricated that provide multiple focal lengths; however, diffractive elements are typically lossy and inefficient. Since as much as fifty percent of incident light can be diffracted in non-useful directions, miniature diffractive lenses are not well suited to applications in which transmission losses are a major concern, such as in optical telecommunications systems.

SUMMARY OF THE INVENTION

Various embodiments in accordance with the invention, a multi-focal length miniature refractive element, are described herein. A monolithic optical element blank has at least two defined surface regions. Each of the surface regions has a different characteristic radius of curvature. The characteristic radius of curvature of each of the surface regions provides a respective focal length.

In a method embodiment in accordance with the invention, a mask element is formed on an optical element blank using a shape transfer process. The mask element perimeter can be circular, elliptical, rectangular, or a more complex shape. The mask element and optical element blank are heated to reduce the viscosity of the mask element blank so that the mask element surface area is minimized by surface tension, thus forming a shape transfer mask. The optical element blank and shape transfer mask are then subject to a sequence of etch processes having different etch selectivities to produce the miniature multi-focal length refractive element.

In another method embodiment, a first shape transfer mask is formed on an optical element blank. The optical element blank and shape transfer mask is then subject to an etch process. Prior to complete removal of the first shape transfer mask, the first shape transfer mask is replaced by a second shape transfer mask. The optical element blank and second shape transfer mask are then subject to an etch process to produce the miniature multi-focal length refractive element.

BRIEF DESCRIPTION OF THE DRAWINGS

The accompanying drawings, which are incorporated in and form a part of this specification, illustrate embodiments in accordance with the invention and, together with the description, serve to explain the principles of the invention.

BEST MODE(S) FOR CARRYING OUT THE INVENTION

Embodiments in accordance with the invention provide a monolithic multi-focal length miniature refractive element having at least two surface regions, in which each of the surface regions has a different characteristic radius of curvature.

As an overview, the following detailed description will describe a multi-focal length refractive element that is fabricated from a single blank using an etch process in combination with a shape transfer mask. The relationship between the radius of curvature of the element surface, the blank and mask material properties, and etch process parameters will be discussed.

Figure 1A:
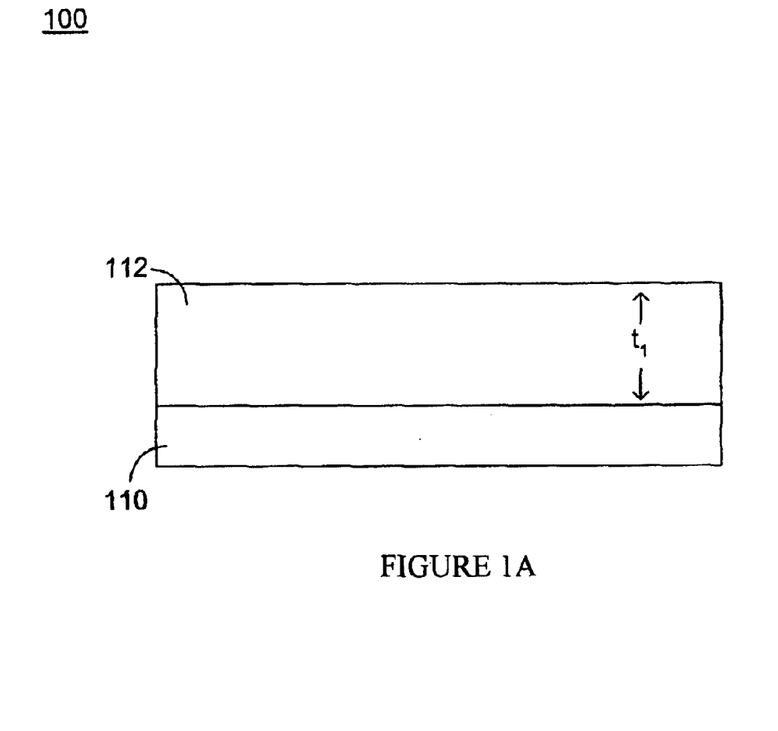
FIG. 1A shows an optical element blank in accordance with an embodiment of the invention.

FIG. 1A shows an intermediate structure 100, including an optical element blank 112 (e.g., a lens blank). Optical element blank 112 includes one or more optical materials, such as silicon (Si), silica ($SiO_2$), gallium arsenide (GaAs), and zinc selenide (ZnSe). In one embodiment, optical element blank 112 is deposited on substrate 110. It should be appreciated that optical element blank 112 can be formed in a variety of ways, such as being deposited onto substrate 110 or grown on substrate 110. Optical element blank 112 has an initial thickness $t_1$. The use of two different materials in an optical element blank 112 enables the fabrication of surface regions having different optical properties (e.g., spectral absorption characteristics or index of refraction).

Figure 1B:
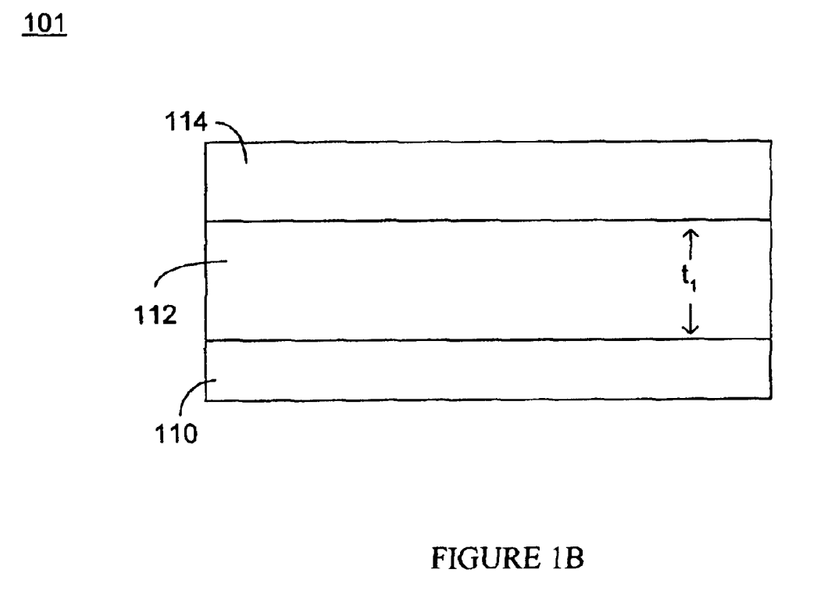
FIG. 1B shows an optical element blank with a mask material layer in accordance with an embodiment of the invention.

FIG. 1B shows an intermediate structure 101, including a mask material layer 114 deposited on optical element blank 112. The mask material layer 114 can be a photosensitive material such as a photoresist, or it can be a non-photosensitive material that is amenable to being be patterned using photolithography or e-beam lithography, such as a metal, metal alloy, or an organic polymer.

Figure 1C:
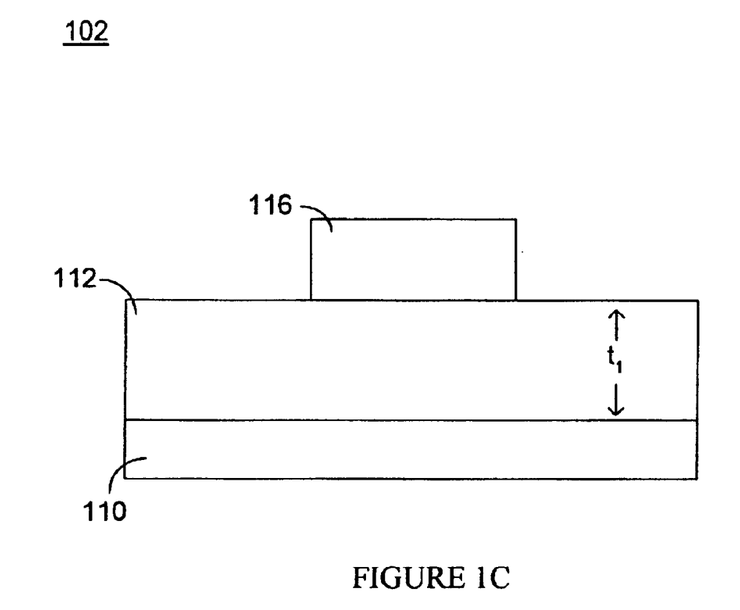
FIG. 1C shows a mask element formed by patterning the mask material layer of FIG. 1B in accordance with an embodiment of the invention.

FIG. 1C shows an intermediate structure 102, with mask material layer 114 patterned to form a mask element 116. The use of a photosensitive material (e.g., photoresist) for mask element 116 has the advantage of dimensional accuracy and fewer process steps. The use of a separate photomask requires more process steps, but allows for the mask material to be selected for specific forming characteristics (e.g. etch selectivity), without requiring the property of photosensitivity. The shape of the perimeter of the mask element 116 can be circular, elliptical, rectangular, or a more complex shape.

Figure 1D:
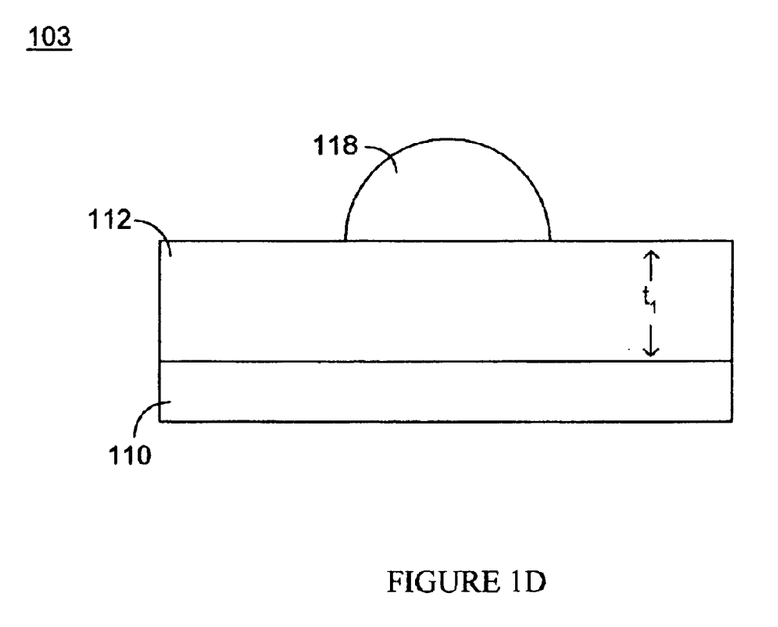
FIG. 1D shows a shape transfer mask formed by flowing the mask element of FIG. 1C in accordance with an embodiment of the invention.

FIG. 1D shows an intermediate structure 103, including a shape transfer mask 118 formed from the mask element 116 of FIG. 1C. The mask element 116 is converted to the shape transfer mask 118 by heating to a temperature that reduces the viscosity of the mask element 116 to a point at which surface tension can minimize the exposed surface area of the mask element 116.

For example, a mask element 116 comprised of photoresist is heated to approximately 118 to 120 degrees Celsius, which is the temperature at which most conventional photoresist material begins to flow. For a mask element 116 with a fixed circular perimeter that does not change during heating, the shape transfer mask will assume the shape of a spherical section, with a radius of curvature determined by the volume and diameter of the mask element 116.

Due to the small size of the mask element, the effects of gravity are minimal, and the shape assumed by the shape transfer mask is dictated primarily by the shape of the perimeter, the volume of the mask element, and the thermodynamically driven minimization of the exposed surface area. Surfaces with multiple radii of curvature can be obtained by using a mask element with a non-circular perimeter. In heating the mask element 116, it is generally desirable to avoid wetting or dewetting that may cause in changes to the perimeter.

The stability of the mask element perimeter during heating is dependent upon the surface energies of the liquid-vapor, solid-liquid, and solid-vapor interfaces, and upon the contact angle at the perimeter. It is desirable to select the mask material and heating parameters so that the mask element perimeter is not destabilized during heating. The substrate surface may optionally be treated to alter the interfacial energy balance and enhance the stability of the mask element perimeter.

Figure 1E:
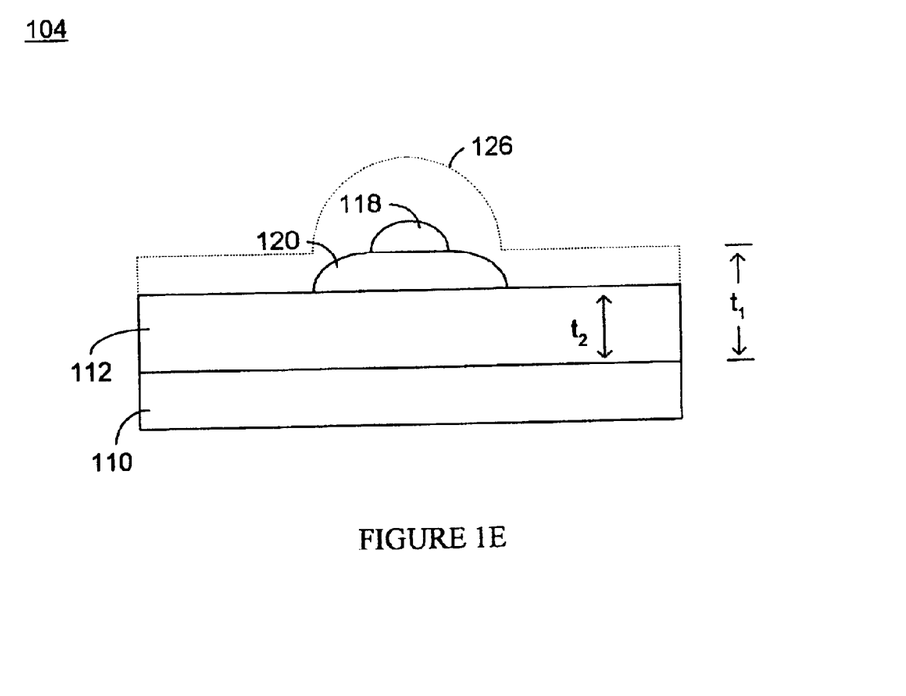
FIG. 1E shows an optical element blank and a shape transfer mask after etching in accordance with an embodiment of the invention.

FIG. 1E shows an intermediate structure 104, in which the optical element blank 112 and shape transfer mask 118 have been etched, with the optical element blank 112 having been etched to a thickness $t_2$. The shape transfer mask 118 of FIG. 1E is smaller than the shape transfer mask 118 of FIG. 1D. The transient masking provided by the shape transfer mask 118 during the etch process has produced in optical element blank 112 a surface region 120 that has a characteristic radius of curvature that is a function of the etch process parameters, the etch rates of the materials constituting the optical element blank 112 and shape transfer mask 118, and the initial geometry of the shape transfer mask 118.

Figure 1F:
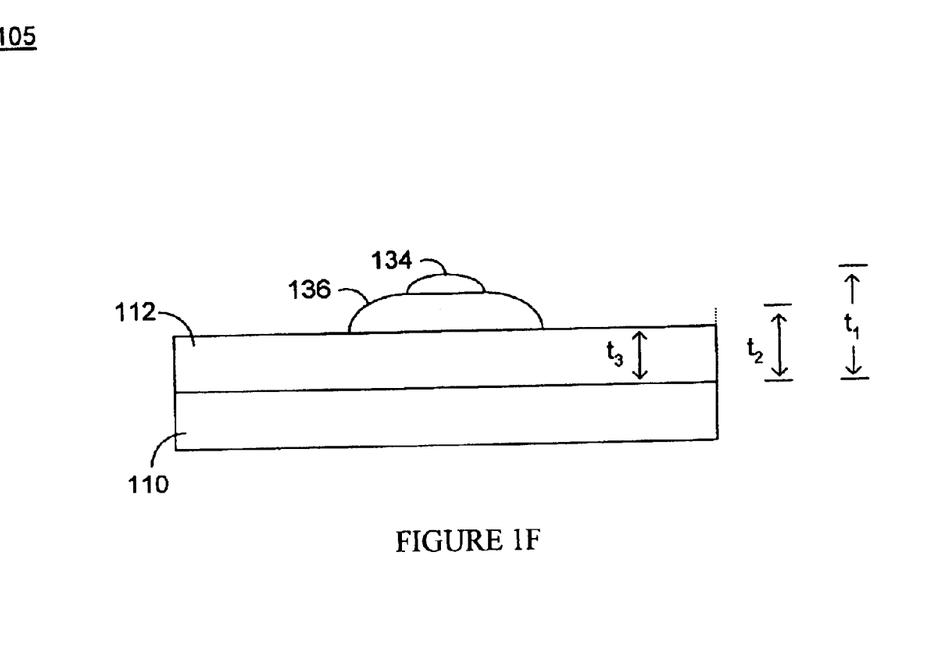
FIG. 1F shows a multi-focal length miniature refractive element in accordance with an embodiment of the invention.

FIG. 1F shows a multi-focal length miniature refractive element 105 that is obtained by etching intermediate structure 104. The multi-focal length miniature refractive element 105 can be obtained by using different shape transfer processes. In one method embodiment, two different shape transfer masks are used and a single set of etch process parameters is used. In a second method embodiment, a single shape transfer mask is used and two sets of etch process parameters are used. In a third embodiment, two shape transfer masks and two sets of etch process parameters are used.

In each of the above described shape transfer processes, a discontinuity in the etching of the optical element blank is introduced. Changing the shape transfer mask or the etch process parameters changes the etching of the optical element blank 112, and produces surface regions 134 and 136. Surface region 134 and surface region 136 have different characteristic radii of curvature. In forming surface region 134, the thickness of the optical element blank 112 is further reduced in thickness to a thickness $t_3$. In the example of FIG. 1F, optical element blank 112 has two surface regions 134 and 136; however, more than two surface regions having different radii of curvature can be formed in the optical blank 112.

The surface curvature that is developed at surface region 120 of the optical element blank 112 during the etch process is a function of the relative etch rates of the optical element blank 112 and the shape transfer mask 118. For purposes of this disclosure, etch selectivity is defined as the ratio of the etch rate of the optical element blank 112 to the etch rate of the shape transfer mask 118. In general, the higher the etch selectivity, the smaller the radius of curvature produced in the surface of the optical element blank 112.

The characteristic radius of curvature of the surface region 120 can be uniform over the surface region. In this case the characteristic radius of curvature is equal to the radius of curvature of the surface region. For a surface region having a radius of curvature that is not uniform, the characteristic radius of curvature is derived from the radii of curvature present. For example, the characteristic radius of curvature can be expressed as the average of the maximum and minimum values of the radii of curvature of the surface region 120.

Figure 1G:
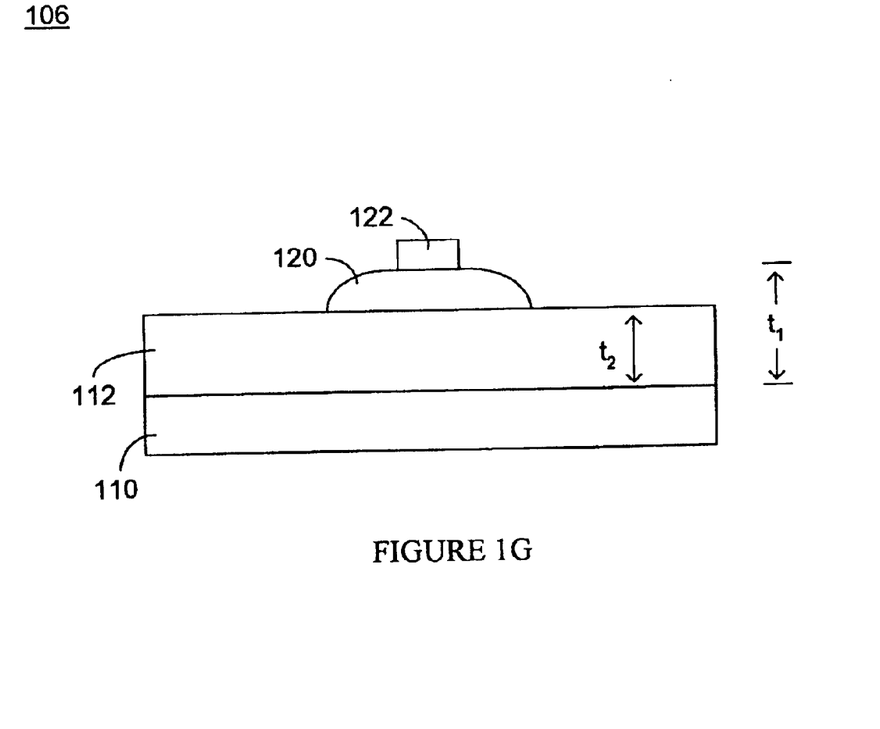
FIG. 1G shows the partially etched optical blank of FIG. 1E with a second applied mask element in accordance with an embodiment of the invention.

FIG. 1G shows an example of intermediate structure 106 that is derived from intermediate structure 104 shown in FIG. 1E by removing shape transfer mask 118 and forming a mask element 122. With respect to removal of the shape transfer mask 118, organic materials such as photoresist can be removed using a suitable solvent, whereas metals can be removed using a suitable wet etch. Mask element 122 can have a different perimeter and volume than shape transfer mask 118, and can also have a different etch rate with respect to the process used to etch intermediate structure 104. Structure 106 is used in a shape transfer process using more than one shape transfer mask.

Figure 1H:
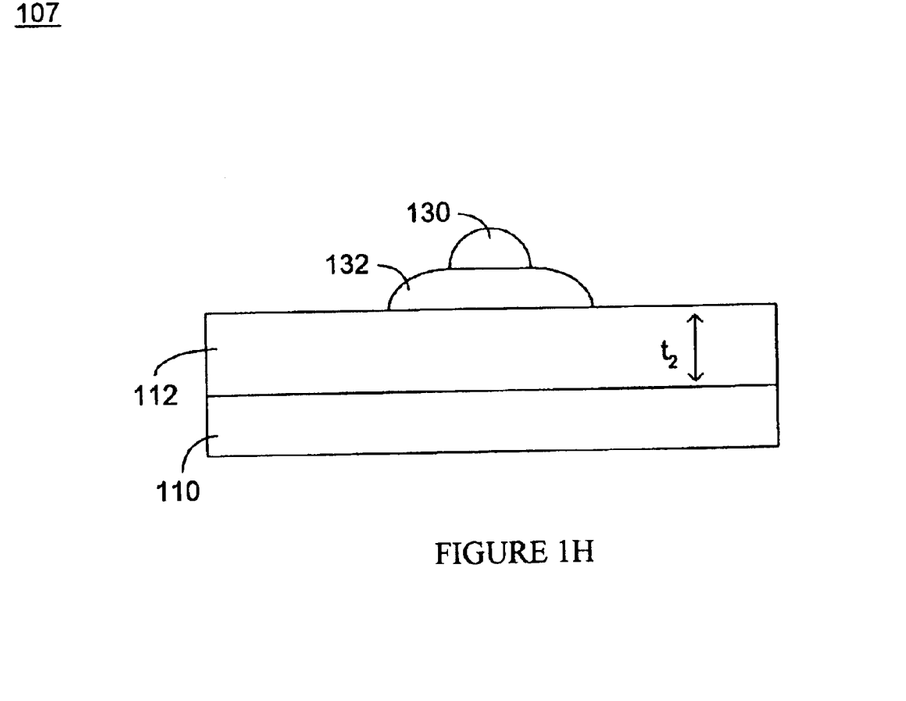
FIG. 1H shows the partially etched optical blank of FIG. 1E with a second formed shape transfer mask in accordance with an embodiment of the invention.

FIG. 1H shows the partially etched optical blank of FIG. 1G with a second shape transfer mask 130 produced from the second mask element 122 in accordance with an embodiment of the invention. The substitution of shape transfer mask 130 for shape transfer mask 118 introduces a discontinuity in the etching of the optical element blank 112 and produces surface regions 134 and 136 of FIG. 1F. Surface region 134 and surface region 136 have different characteristic radii of curvature due to the shape transfer mask substitution. The forming of the second shape transfer mask 130 can be done using a surface area minimization process similar to that described above with reference to FIG. 1D.

The shape transfer process used to fabricate the multifocal length refractive element has several variables that can be controlled or selected to influence the overall process. These variables pertain to the basic etch process used for material removal and the etch properties of the materials of the optical element blank and shape transfer mask. For example in an argon ion milling, the base pressure, ionization power, and acceleration voltage can be adjusted. Etch selectivity of the shape transfer process can be modified for a given set of etch process parameters by material substitution in the shape transfer mask. Alternatively, the etch selectivity can be modified by material substitution in the optical element blank.

Figure 2A:
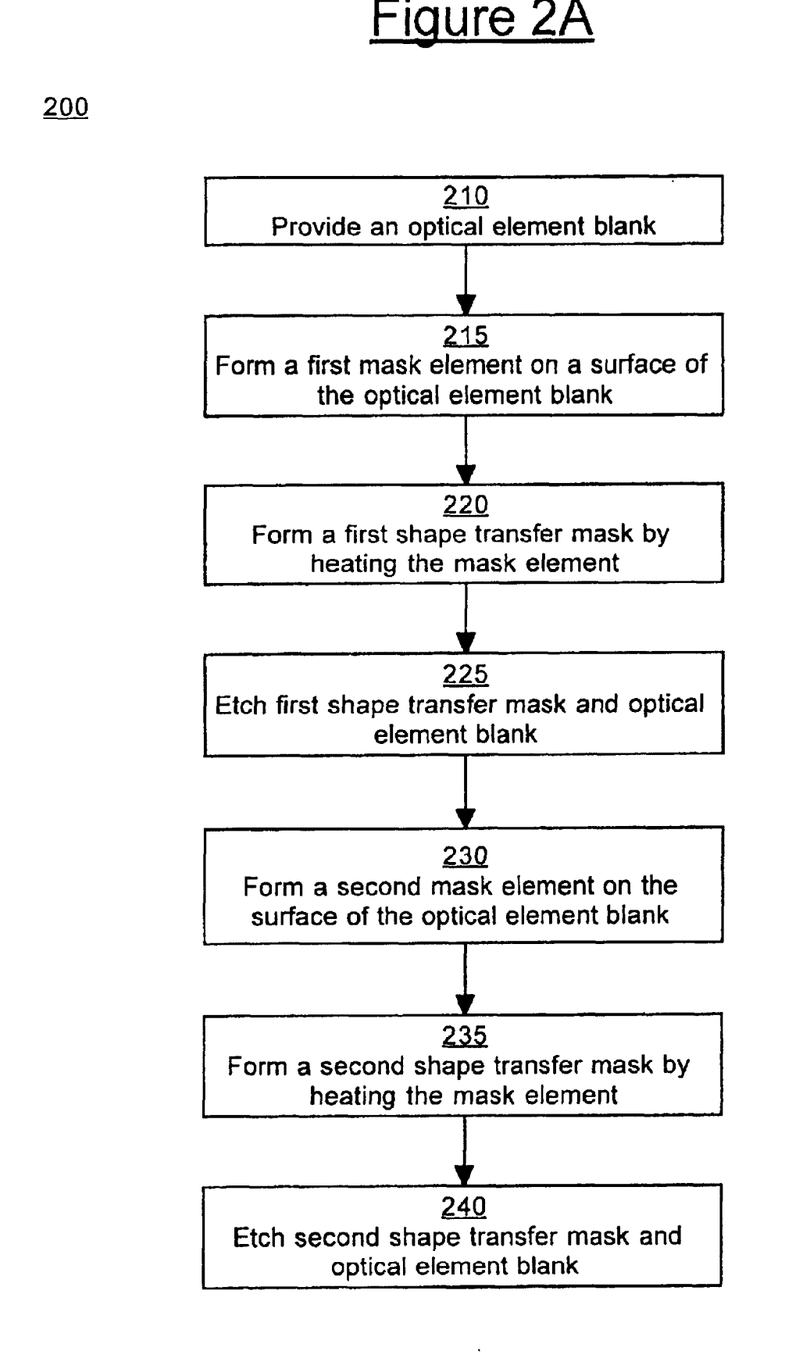
FIG. 2A shows a flowchart for a process for making a multi-focal length miniature refractive element in accordance with an embodiment of the invention.

FIG. 2A shows a flowchart 200 depicting a first embodiment of a method in accordance with the invention for fabricating a multi-focal length miniature refractive element. This embodiment of the method uses a single set of etch process parameters and two shape transfer masks. In block 210, an optical element blank is provided. The optical element blank can be formed by depositing a material on a substrate, or by joining two or more pieces of material. Formation of the blank may include a surface treatment to control the interfacial energy of subsequently deposited materials.

In block 215, a first mask element is formed. The mask element material can be a photosensitive material. Alternatively, it can be a material that is amenable to patterning by photolithography, or e-beam lithography, or otherwise. In the case of a photosensitive material (e.g., photoresist), the mask element can be formed directly by exposure and development.

For non-photosensitive materials the first mask element is formed using photolithography, or e-beam lithography, or otherwise. In using photolithography or e-beam lithography, a subtractive technique can be used in which a film is deposited and etched. Alternatively, an additive process can be used in which the mask element is formed by depositing a material through a mask.

In block 220, a first shape transfer mask is formed by heating the first mask element. The mask element is heated to a temperature at which surface tension minimizes the surface area of the mask element. It is preferable that the perimeter of the mask element remain stable during the heating process. The stability of the mask element perimeter can be enhanced by limiting the viscosity reduction of the mask element and by using materials that exhibit a gradual melting behavior in preference to those with a well defined melting point.

In block 225, the shape transfer mask and optical element blank are subject to a first etch process that is effective against both the optical element blank and the shape transfer mask 210. Etching of the initially exposed area of the optical blank is immediate, with etching of the remaining portion of the optical blank surface being delayed until the overlying portion of the shape transfer mask has been etched back. The first etch is stopped prior to complete removal of the shape transfer mask.

In block 230, a second shape transfer mask is formed. The remaining portion of the first shape transfer can be removed or can be left in place. The second mask material can be the same material as the first layer, or it can be a different material. The second mask element can be formed by additive or subtractive processes.

In block 235, the second shape transfer mask is formed by heating the second mask element to a temperature at which surface tension minimizes the surface area of the element blank in a process similar to the process used in block 220 to form the first shape transfer mask. The second shape transfer mask is distinguished from the first shape transfer at the end of the first etch by one or more of chemical composition, volume, or perimeter.

In block 240, the second shape transfer mask and optical element blank are subject to the etch process for a second time. The second etch can be halted prior to complete removal of the second shape transfer mask, or the second shape transfer mask can be completely removed during the second etch.

Figure 2B:
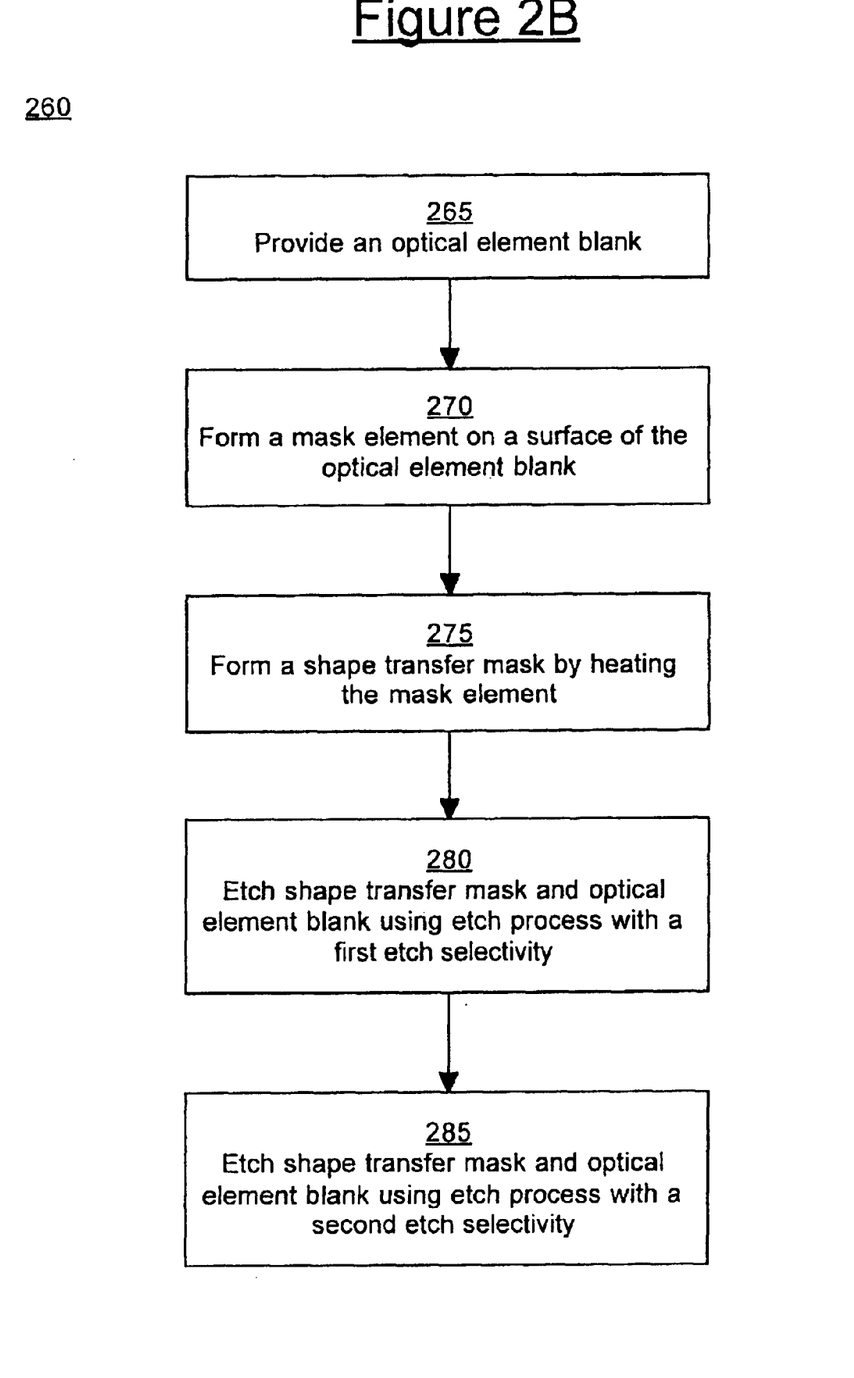
FIG. 2B shows a flowchart for a process for making a multi-focal length miniature refractive element using a single shape transfer mask in accordance with an embodiment of the invention.

FIG. 2B shows a flowchart 260 depicting a second embodiment of a method in accordance with the invention for fabricating a multi-focal length miniature refractive element. In contrast to the method shown in FIG. 2A, the embodiment shown in FIG. 2B uses a single shape transfer mask and two etch processes.

In block 265, an optical element blank is provided. The optical element blank can be formed by depositing a material on a substrate, or by joining two or more pieces of material. Formation of the blank may include a surface treatment to control the interfacial energy of subsequently deposited materials.

In block 270, a mask element is formed. The mask element material can be a photosensitive material. Alternatively, it can be a material that is amenable to patterning by photolithography, or e-beam lithography, or otherwise. In the case of a photosensitive material (e.g., photoresist), the mask element can be formed directly by exposure and development.

For non-photosensitive materials the first mask element can be formed using photolithography, or e-beam lithography, or otherwise. In using photolithography or e-beam lithography, a subtractive technique can be used in which a film is deposited and etched. Alternatively, an additive process can be used in which the mask element is formed by depositing a material through a mask.

In block 275, a shape transfer mask is formed by heating the first mask element. The mask element is heated to a temperature at which surface tension minimizes the surface area of the mask element. It is preferable that the perimeter of the mask element remain stable during the heating process. The stability of the mask element perimeter can be enhanced by limiting the viscosity reduction of the mask element, and by using materials that exhibit a gradual melting behavior in preference to those with a well defined melting point.

In block 280, the shape transfer mask and optical element blank are subject to a first etch process that is effective against both the optical element blank and the shape transfer mask 210. The first etch process is characterized by a first etch selectivity. Etching of the initially exposed area of the optical blank is immediate, with etching of the remaining portion of the optical blank surface being delayed until the overlying portion of the shape transfer mask has been etched back. The first etch process is stopped prior to complete removal of the shape transfer mask.

In block 285, the shape transfer mask and optical element blank are subject to a second etch process that is effective against both the optical element blank and the shape transfer mask. The second etch process is characterized by a second etch selectivity that is different from the first etch selectivity of the first etch process. The second etch process can be halted prior to complete removal of the shape transfer mask, or the shape transfer mask can be completely removed.

The method shown in FIG. 2B is advantageous when the two surface regions of a monolithic multi-focal refractive element are required to have a common optical axis. Since a single shape transfer mask is used for etching both surface regions, misalignment associated with mask registration for two different shape transfer masks is avoided.

Figure 3A:
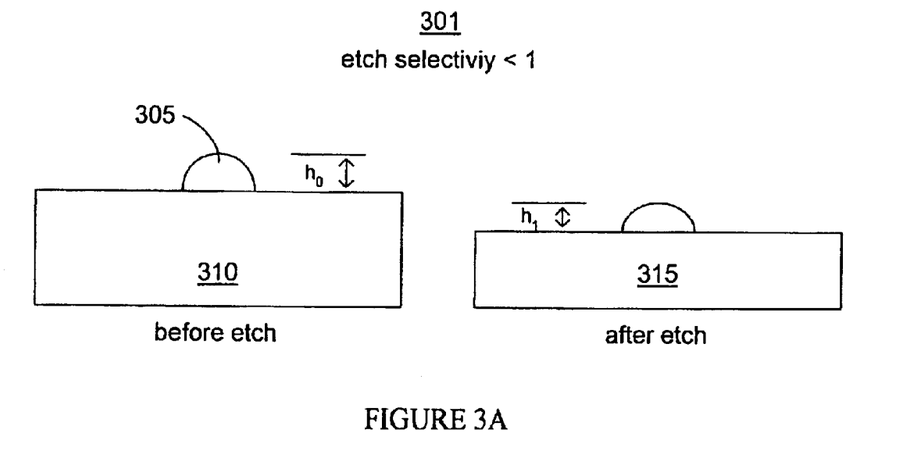
FIG. 3A shows a schematic representation of a shape transfer process having an etch selectivity less than one in accordance with an embodiment of the invention.
Figure 3B:
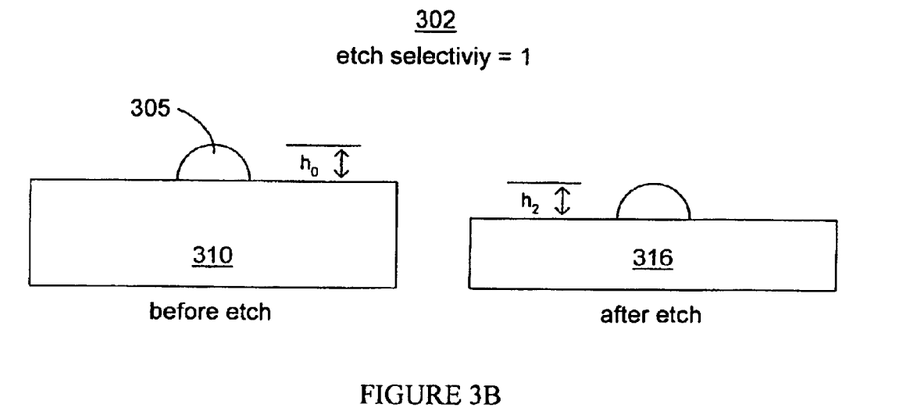
FIG. 3B shows a schematic representation of a shape transfer process having an etch selectivity equal to one in accordance with an embodiment of the invention.
Figure 3C:
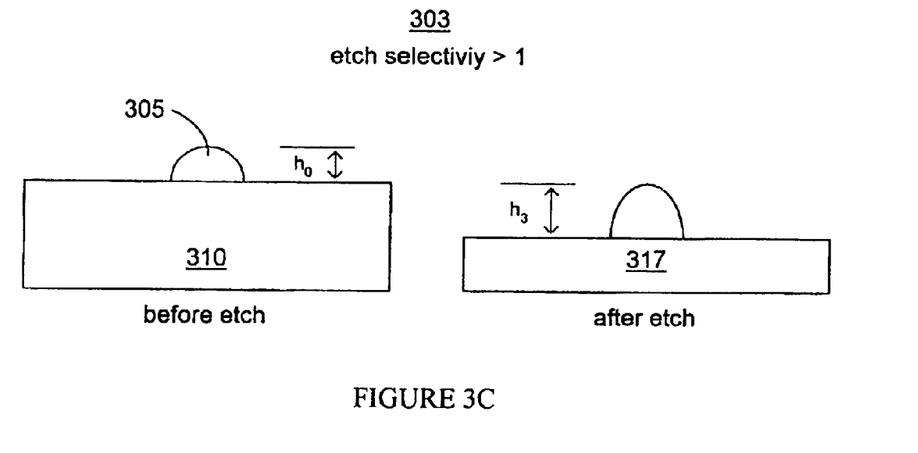
FIG. 3C shows a schematic representation of a shape transfer process having an etch selectivity greater than one in accordance with an embodiment of the invention.

FIGS. 3A–3C show the effects of different etch selectivities on the shape transfer process. The etch process depicted is essentially an anisotropic etch process (e.g., ion milling). Isotropic etch processes or etch processes with varying degrees of isotropy can be used in embodiments of the invention. However, for isotropic etches with a selectivity greater than one, undercutting of the shape transfer mask is possible. Reactive ion etching (RIE) can be used.

It should be appreciated that the etch selectivity of the forming process, such as one using a dry chemical etch, can be changed by modifying one or more process variables, such as pressure, temperature, or chemical composition. For ion milling or plasma assisted processes, the electrical input parameters can be adjusted.

FIG. 3A shows a schematic representation 301 of a shape transfer etch process having an etch selectivity less than one. An optical element blank 310 is shown with a shape transfer mask 305 having a height ho before etching. After removal of the shape transfer mask 305 using an etch process with an etch selectivity less than one, the height $h_1$ of the transferred shape of element 315 is less than $h_0$.

FIG. 3B shows a schematic representation 302 of a shape transfer etch process having an etch selectivity equal to one. After removal of the shape transfer mask 305 using an etch process with an etch selectivity equal to one, the height $h_2$ of the transferred shape of element 316 is equal to $h_0$.

FIG. 3C shows a schematic representation 303 of a shape transfer etch process having an etch selectivity greater than one. After removal of the shape transfer mask 305 using an etch process with an etch selectivity greater than one, the height $h_3$ of the transferred shape of element 317 is greater than $h_0$.

Figure 4:
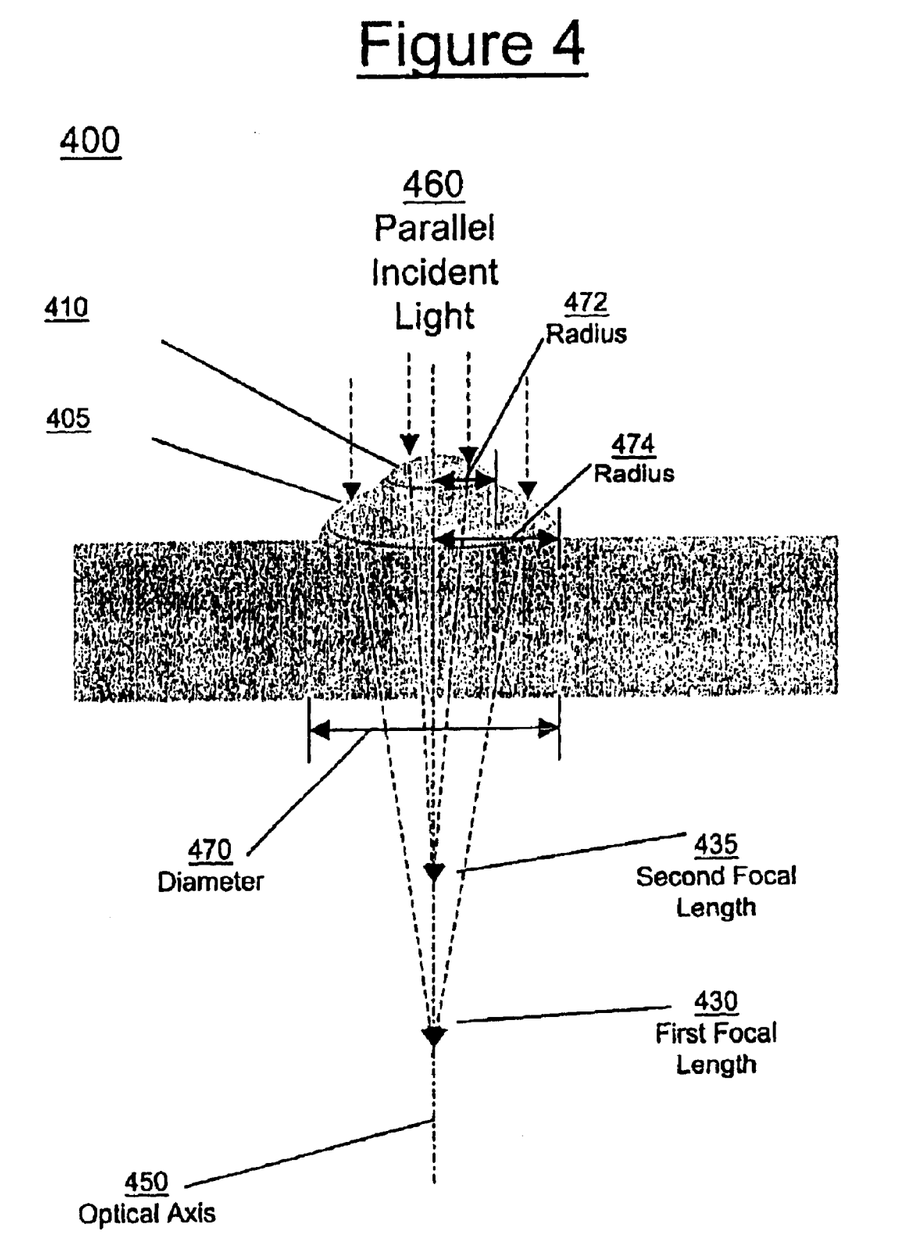
FIG. 4 is an illustration of a multi-focal length miniature refractive lens having two different characteristic radii of curvature in accordance with an embodiment of the invention.

FIG. 4 is an illustration of a monolithic multi-focal length miniature refractive element 400 having two focal lengths in accordance with an embodiment of the invention. Multi-focal length miniature refractive element 400 has a first surface region 405 and a second surface region 410. Surface region 405 has a first characteristic radius of curvature that defines a first focal length 430. Surface region 410 has a second characteristic radius of curvature that defines a focal length 435. When parallel incident light 460 strikes multi-focal length miniature refractive element 400, the light is focused to two distinct focal planes defined by the two focal lengths, respectively.

Surface region 405 has a circular perimeter with a radius 474. Surface region 410 has a circular perimeter with a radius 472. The two surface regions have a common axis of symmetry that coincides with the optical axis 450 of the monolithic multi-focal length miniature refractive element 400.

The monolithic multi-focal length miniature refractive element 400 is composed of one or more optical materials. Examples of such optical are silicon (Si), silica ($SiO_2$), gallium arsenide (GaAs), and zinc selenide (ZnSe). In one embodiment, multi-focal length miniature refractive element 400 has a diameter 470 of less than five millimeters.

Heteroepitaxial growth can be used to provide an optical element blank for fabricating the monolithic multi-focal length miniature refractive element 400. By heteroepitaxially depositing a second material on a single crystal of a first material, an optical element blank having different regions with different optical properties (e.g., optical absorption or index of refraction) can be provided. When such a composite optical blank is used surface region 405 and 410 can be produced in portions of the optical element blank having different optical properties.

In an embodiment, a monolithic multi-focal length miniature refractive element is formed from an optical element blank 112 (FIG. 1A). The use of a single crystal material minimizes interfacial scattering or reflection that can occur in a multi-focal length miniature refractive element that is assembled from sub-elements.

Figure 5:
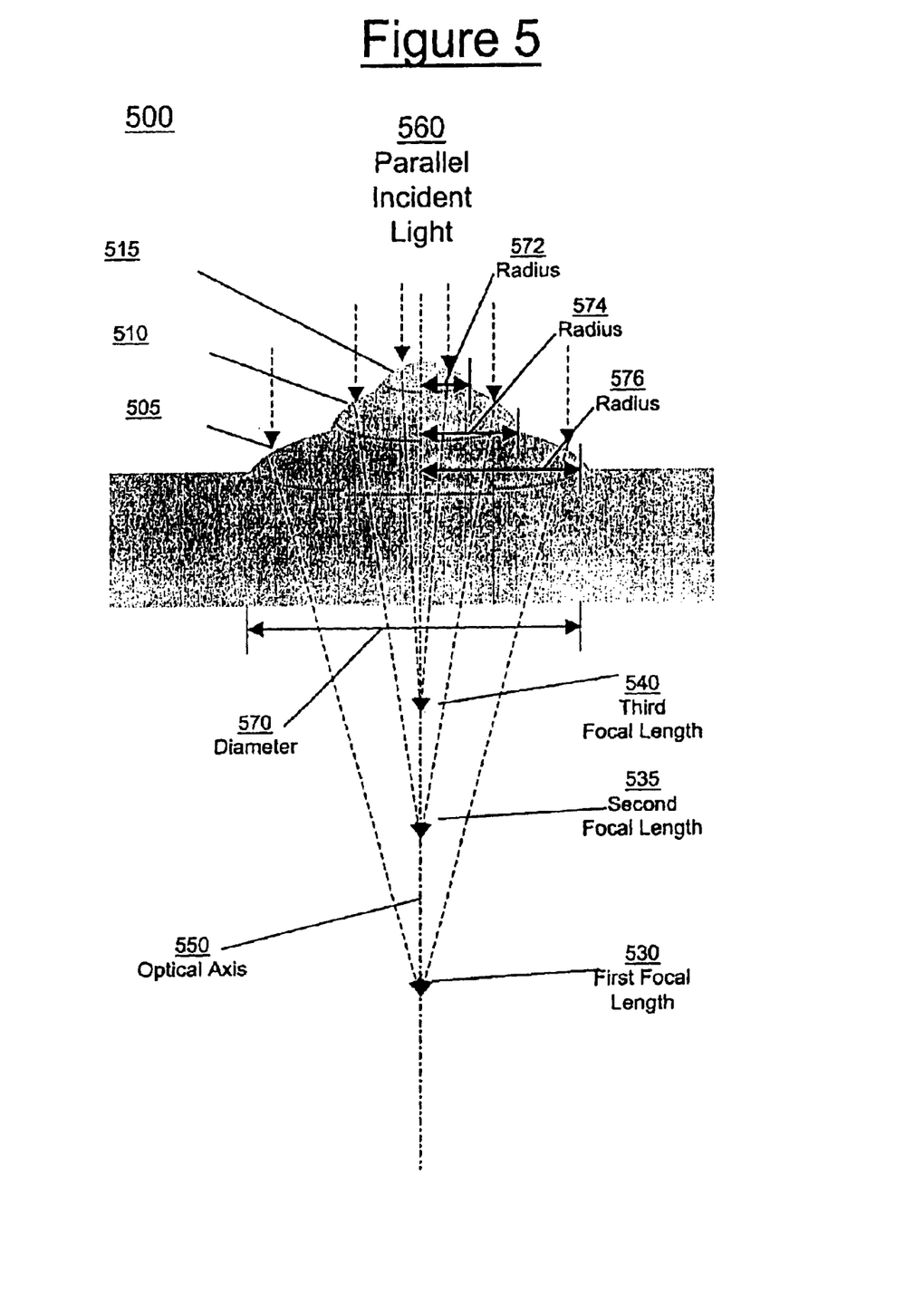
FIG. 5 is an illustration of a multi-focal length miniature refractive lens having three different characteristic radii of curvature in accordance with an embodiment of the invention.

FIG. 5 is an illustration of a monolithic multi-focal length miniature reactive element 500 having three focal lengths in accordance with an embodiment of the invention. Multi-focal length miniature refractive element 500 has a first surface region 505, a second surface region 510, and a third surface region 515. First surface region 505 has a first characteristic radius of curvature that defines a first focal length 530, second surface region 510 has a second characteristic radius of curvature that defines a second focal length 535, and third surface region 515 has a third characteristic radius of curvature that defines a third focal length 540.

Surface region 515 has a circular perimeter with a radius 572. Surface region 510 has a circular perimeter with a radius 574. Surface region 505 has a circular perimeter with a radius 576. The surface regions have a common axis of symmetry that is coincident with the optical axis 550 of the multi-focal length miniature refractive element 500. When parallel incident light 560 strikes multi-focal length miniature refractive element 500, light is focused along the optical axis 550 at three focal lengths 530, 535 and 540, by the surface regions 505, 510, and 515, respectively.

The monolithic multi-focal length miniature refractive element 500 is composed of one or more optical materials. Examples of such optical materials are silicon (Si), silica ($SiO_2$), gallium arsenide (GaAs), and zinc selenide (ZnSe). In one embodiment, multi-focal length miniature refractive element 500 has a diameter 570 of less than five millimeters.

Heteroepitaxial growth can be used to provide an optical element blank for fabricating the monolithic multi-focal length miniature refractive element 400. By heteroepitaxially depositing multiple optical material layers on a single crystal of a first material, an optical element blank having different regions with different optical properties (e.g., optical absorption or index of refraction) can be provided. When such a composite optical blank is used each of the surface regions 505, 510 and 515 may reside on a portion of the optical element blank having different optical properties.

Hence, embodiments in accordance with the invention provide a miniature optical element having multiple focal lengths. Moreover, as described above, embodiments in accordance with the invention eliminate the need for a diffractive optical element. Refractive elements typically provide over than ninety percent transmission efficiency in their passband, limiting transmission loss to less than ten percent. By providing a multi-focal length miniature refractive element that is highly efficient, many optical applications can perform with very low transmission loss. Furthermore, embodiments in accordance with the invention can be formed using standard semiconductor pattern process techniques, eliminating the need to create a new process for forming a multi-focal length miniature refractive element.

Various embodiments in accordance with the invention, a multi-focal length miniature refractive element, are thus described. While the invention has been described in particular embodiments, it should be appreciated that the invention should not be construed as limited by such embodiments, but rather construed according to the below claims.

What is claimed is:

1. A monolithic multi-focal length refractive element comprising:
    a single monolithic optical element blank comprising:
        a first surface region having a first characteristic radius of curvature; and
        a second surface region having a second characteristic radius of curvature, wherein said monolithic multi-focal length refractive element has a maximum dimension of less than five millimeters.

2. The monolithic multi-focal length refractive element as recited in claim 1, wherein a value of an optical property for said first surface region is different from a value of said optical property for said second surface region.

3. The monolithic multi-focal length refractive element as recited in claim 2 wherein said optical element blank comprises silica ($SiO_2$).

4. The monolithic multi-focal length refractive element as recited in claim 2 wherein said optical element blank comprises gallium arsenide (GaAs).

5. The monolithic multi-focal length refractive element as recited in claim 1, wherein said monolithic optical element blank comprises a third surface region having a third characteristic radius of curvature.

6. A method for making a multi-focal length refractive element, said method comprising:
    forming in an optical element blank a first surface region characterized by a first radius of curvature by etching said optical element blank using a first etch process having a first etch selectivity; and
    forming on said optical element blank a second surface region characterized by a second radius of curvature by etching said optical element blank using a second etch process having a second etch selectivity.

7. The method as recited in claim 6 wherein said first etch selectivity is less than said second etch selectivity.

8. The method as recited in claim 6 additionally comprising forming a first shape transfer mask and etching said first shape transfer mask using said first etch process.

9. The method as recited in claim 8 additionally comprising etching said first shape transfer mask using said second etch process.

10. The method as recited in claim 8 additionally comprising forming a second shape transfer mask.

11. The method as recited in claim 10 additionally comprising using said second etch process to etch said second shape transfer mask.

12. A method for making a multi-focal length refractive element, said method comprising:
    forming in an optical element blank a first surface region characterized by a first radius of curvature;
    forming on said optical element blank a second surface region characterized by a second radius of curvature;
    forming a first shape transfer mask and etching said first shape transfer mask using a first etch process; and
    etching said first shape transfer mask using a second etch process.

13. The method as recited in claim 12 wherein said forming said first surface region comprises etching said optical element blank using said first etch process having a first etch selectivity.

14. The method as recited in claim 13 wherein said forming said second surface region comprises etching said optical element blank using said second etch process having a second etch selectivity.

15. The method as recited in claim 14 wherein said first etch selectivity is less than said second etch selectivity.

16. The method as recited in claim 12 additionally comprising forming a second shape transfer mask.

17. The method as recited in claim 16 additionally comprising using said second etch process to etch said second shape transfer mask.

* * * * *